US009656866B2

(12) United States Patent
Shirota et al.

(10) Patent No.: US 9,656,866 B2
(45) Date of Patent: May 23, 2017

(54) OZONE GENERATION DEVICE AND FUSE HOLDER

(71) Applicant: Kabushiki Kaisha Toshiba, Minato-ku, Tokyo (JP)

(72) Inventors: Akihiko Shirota, Hachioji Tokyo (JP); Kazuhiko Noda, Hino Tokyo (JP); Michiko Hashimoto, Atsugi Kanagawa (JP); Kie Kubo, Toshima Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/915,196

(22) PCT Filed: Mar. 11, 2014

(86) PCT No.: PCT/JP2014/056375
§ 371 (c)(1),
(2) Date: Feb. 26, 2016

(87) PCT Pub. No.: WO2015/029475
PCT Pub. Date: Mar. 5, 2015

(65) Prior Publication Data
US 2016/0207768 A1 Jul. 21, 2016

(30) Foreign Application Priority Data

Aug. 30, 2013 (JP) .................................. 2013-180473

(51) Int. Cl.
*C01B 13/11* (2006.01)
*H01H 85/042* (2006.01)
(Continued)

(52) U.S. Cl.
CPC ........... *C01B 13/11* (2013.01); *H01H 85/042* (2013.01); *H01H 85/20* (2013.01);
(Continued)

(58) Field of Classification Search
CPC . C01B 13/11; C01B 2201/14; C01B 2201/22; H01H 85/042; H01H 85/175; H01H 85/20; H01T 19/00
See application file for complete search history.

(56) References Cited

U.S. PATENT DOCUMENTS 8,663,569 B2 3/2014 Murata et al.
2012/0156106 A1 6/2012 Murata et al.

FOREIGN PATENT DOCUMENTS

JP S49-151262 U 12/1974
JP 1977-111488 * 9/1977
(Continued)

OTHER PUBLICATIONS

International Search Report mailed by Japan Patent Office on Jun. 17, 2014 in corresponding PCT Application No. PCT/JP2014/056375—5 pages.
(Continued)

*Primary Examiner* — Kishor Mayekar
(74) *Attorney, Agent, or Firm* — Knobbe, Martens, Olson & Bear LLP

(57) ABSTRACT

According to one embodiment, an ozone generation device includes a first electrode unit, a second electrode unit, a fuse and a fuse holder. The first electrode unit is provided on an inner face of a discharge tube. The second electrode unit is provided outside the discharge tube at an interval. The second electrode faces the first electrode unit. A diameter of the outer face of the fuse is smaller than a diameter of the inner face. At least a part of the outer face is positioned inside the discharge tube. The fuse holder is interposed between the discharge tube and the fuse, includes the outer periphery and an inner periphery and is provided with a first opening and a second opening. The outer periphery extends in an arc along the inner face to come into contact with the
(Continued)

inner face. The inner periphery extends in an arc along the outer face to come into contact with the outer face.

5 Claims, 4 Drawing Sheets

(51) Int. Cl.
  *H01H 85/20* (2006.01)
  *H01H 85/175* (2006.01)
  *H01T 19/00* (2006.01)

(52) U.S. Cl.
  CPC ...... *C01B 2201/14* (2013.01); *C01B 2201/22* (2013.01); *H01H 85/175* (2013.01); *H01T 19/00* (2013.01)

(56) References Cited

FOREIGN PATENT DOCUMENTS

| JP | H01-177241 U | 12/1989 |
|---|---|---|
| JP | H07-277706 A | 10/1995 |
| JP | 2007-169134 A | 7/2007 |
| JP | 2012-144425 A | 8/2012 |
| JP | 2013-184874 A | 9/2013 |

OTHER PUBLICATIONS

An English translation of Written Opinion mailed by Japan Patent Office on Jun. 17, 2014 in the corresponding PCT Application No. PCT/JP2014/056375—6 pages.

* cited by examiner

OZONE GENERATION DEVICE AND FUSE HOLDER

CROSS-REFERENCE TO RELATED APPLICATIONS

This application is national stage application of International Application No. PCT/JP2014/056375, filed Mar. 11, 2014, which designates the United States, incorporated herein by reference, and which claims the benefit of priority from Japanese Patent Application No. 2013-180473 filed Aug. 30, 2013, the entire contents of which are incorporated herein by reference.

FIELD

Embodiments described herein relate generally to an ozone generation device and a fuse holder.

BACKGROUND

An ozone generation device in which a fuse holder is interposed between a discharge tube and a fuse has been conventionally known.

DETAILED DESCRIPTION

In general, according to one embodiment, an ozone generation device comprises a first electrode unit, a second electrode unit, a fuse and a fuse holder. The first electrode unit is provided on an inner face of a discharge tube having a cylindrical shape. The second electrode unit is provided outside the discharge tube at an interval. The second electrode faces the first electrode unit. The fuse comprises an outer face. A diameter of the outer face is smaller than a diameter of the inner face. The fuse has a cylindrical shape. At least a part of the outer face is positioned inside the discharge tube. The fuse holder has a C shape as well as a plate shape substantially. The fuse holder is interposed between the discharge tube and the fuse. The fuse holder comprises the outer periphery and an inner periphery and is provided with a first opening and a second opening. The outer periphery extends in an arc along the inner face to come into contact with the inner face. The inner periphery extends in an arc along the outer face to come into contact with the outer face. The first opening is positioned on a side of an axial center of the inner periphery to receive the fuse. The second opening opens the first opening outwardly in a radial direction of the axial center.

Hereinafter, an embodiment will be described with reference to the accompanying drawings. The structure of the embodiment described below, and the operations and results (effects) provided by the structure are merely examples. The present invention can also be achieved by the structure other than that disclosed in the following embodiment, and can obtain various effects (including secondary effects) based on the basic structure.

Figure 1:
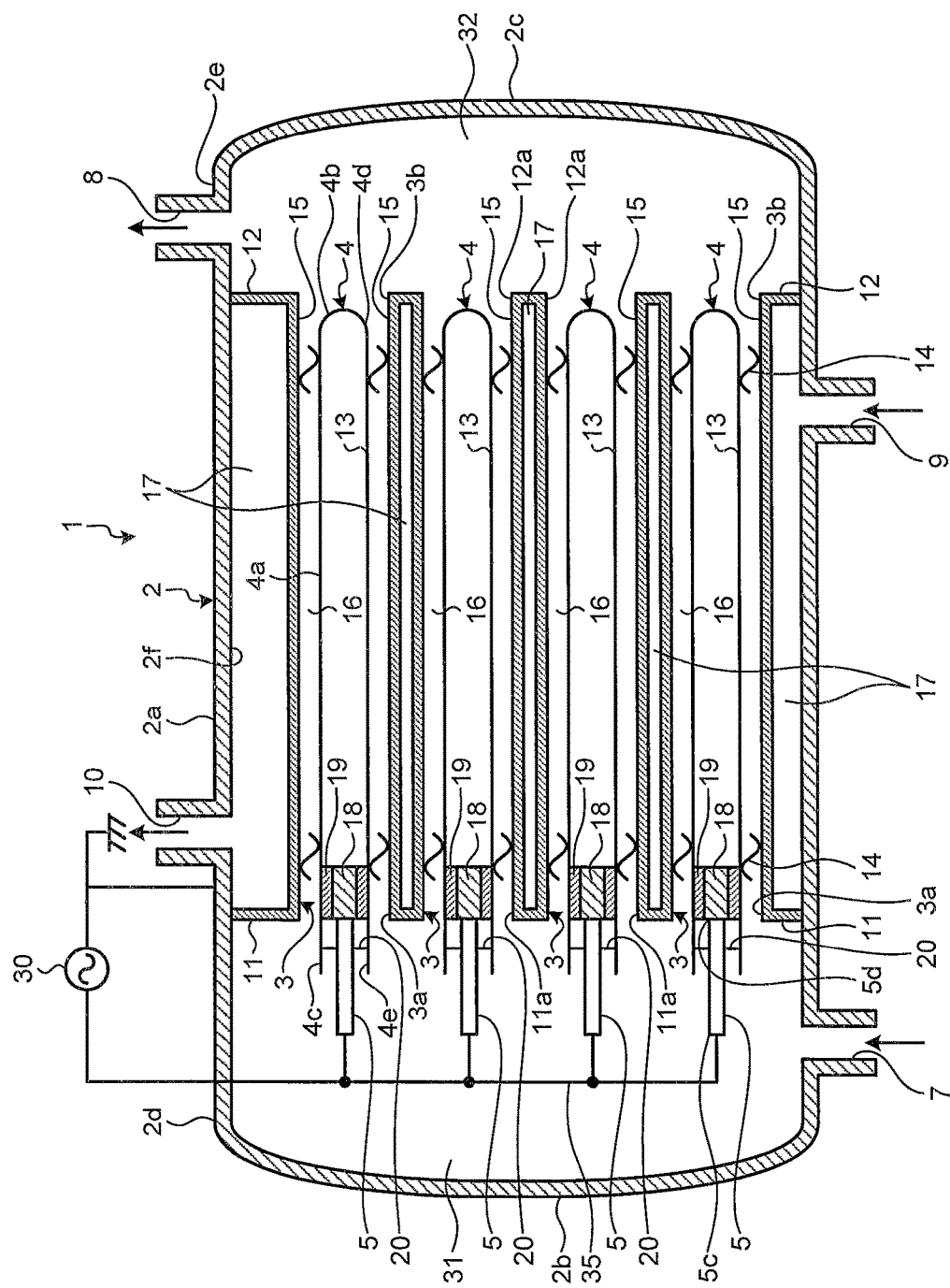
FIG. 1 is a sectional view of an example of an ozone generation device according to an embodiment.

In the present embodiment, for example, as illustrated in FIG. 1, an ozone generation device 1 comprises a housing 2, a discharge tube 4, a first electrode unit 13, a second electrode unit 15, a fuse 5, a fuse holder 20, and a power supply unit 30. The ozone generation device 1 introduces raw material gas (such as dry air and oxygen gas) including oxygen into the housing 2, thereby supplying the raw material gas into a discharge space 16 (gap and discharge gap) provided between the first electrode unit 13 and the second electrode unit 15. At this time, with high voltage applied between the first electrode unit 13 and the second electrode unit 15 via the power supply unit 30, silent discharge occurs in the discharge space 16. Consequently, the raw material gas that passes through the discharge space 16 is converted into ozone.

The housing 2 (container, airtight container, and can body), for example, includes a tube 2a (cylinder) and a pair of closing portions 2b and 2c (closing boards, end plates, and lids). The closing portion 2b closes an end 2d at one side of the tube 2a in an axial direction, and the closing portion 2c closes an end 2e at the other side of the tube 2a in the axial direction. An introduction port 7 that introduces the raw material gas is provided at the end 2d of the tube 2a, and a discharge port 8 that discharges ozonized gas obtained by ozonization in the discharge space 16, is provided at the end 2e of the tube 2a. At a position overlapping with the second electrode unit 15 of the tube 2a, an introduction inlet 9 that introduces cooling water that cools the second electrode unit 15 and a discharge outlet 10 that discharges the cooling water are provided. The housing 2, for example, may be made of stainless steel.

Figure 2:
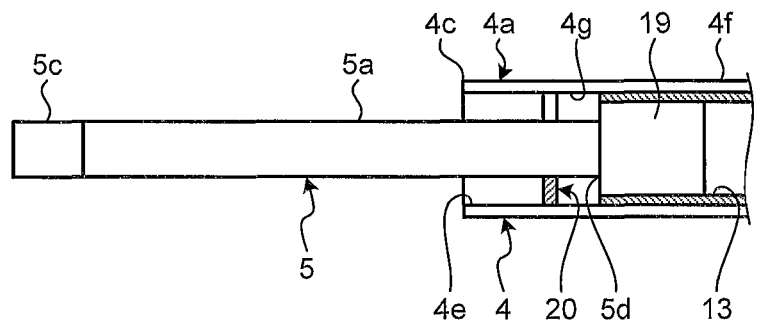
FIG. 2 is an enlarged view at or near a fuse holder of an example of the ozone generation device according to the embodiment.
Figure 5:
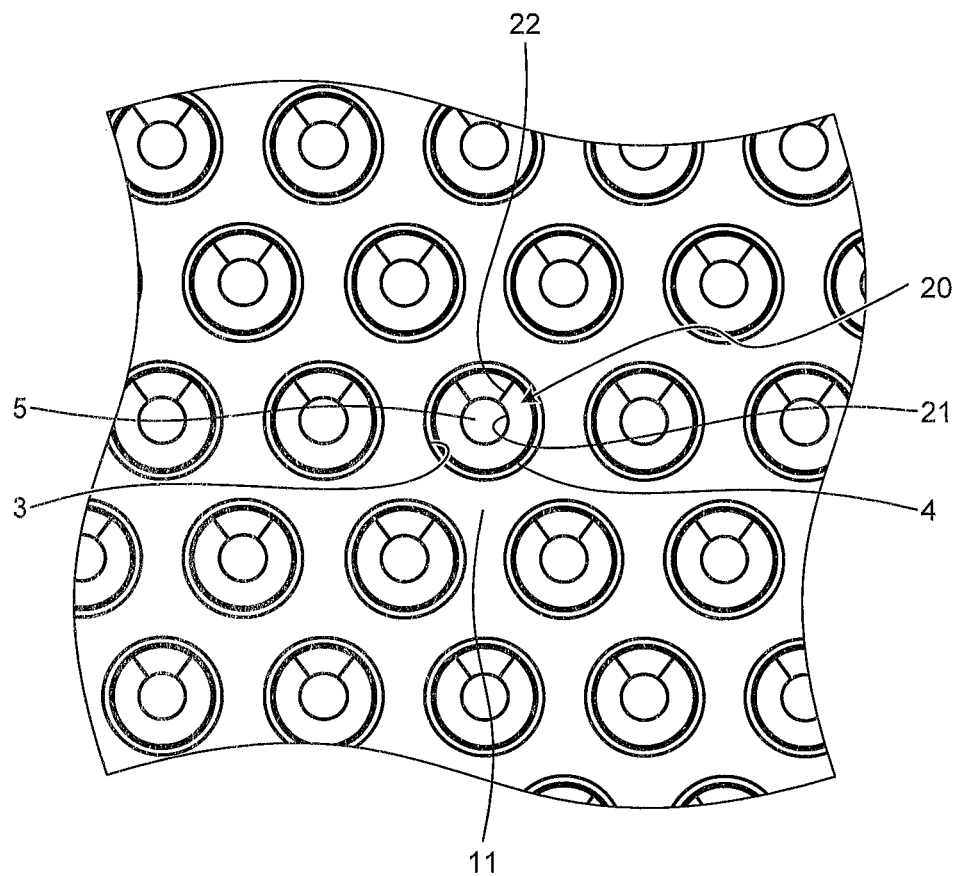
FIG. 5 is a plan view of an example of a fuse fitted with the fuse holder according to the embodiment.

The discharge tube 4, for example, as illustrated in FIGS. 1, 2, and 5, has a tubular shape (cylindrical shape). More specifically, the discharge tube 4 includes a tube 4a (cylinder) and a closing portion 4b (closing board, end plate, and lid). An opening 4e is provided at an end 4c at one side of the discharge tube 4 in the axial direction, and the side of the end 4c of the discharge tube 4 is opened at the opening 4e. An end 4d at the other side of the discharge tube 4 in the axial direction is closed by the closing portion 4b. The fuse 5 is fitted to the opening 4e of the discharge tube 4. The discharge tube 4 also includes an outer face 4f (outer peripheral face, outside face, and face) and an inner face 4g (inner peripheral face, inside face, and face).

The first electrode unit 13, for example, is provided on the inner face 4g of the discharge tube 4. More specifically, the first electrode unit 13 has a tubular shape (in the present embodiment, for example, a cylindrical shape) along the inner face 4g of the discharge tube 4. More specifically, the first electrode unit 13 is provided on the inner face 4g of the discharge tube 4 in a film state (thin plate state), by vapor-depositing a conductive metal material (such as aluminum, nickel, and stainless steel) thereon.

The second electrode unit 15, for example, is configured with a tubular-shaped (cylindrical-shaped) grounding electrode tube 3. The grounding electrode tube 3 is provided outside the discharge tube 4 at an interval, and faces the first electrode unit 13. A spacer 14 is interposed between the grounding electrode tube 3 and the discharge tube 4. The grounding electrode tube 3 and the discharge tube 4 are placed concentrically. The discharge space 16 with a substantially constant height in the radial direction, which extends in the axial direction, is provided between the first electrode unit 13 and the grounding electrode tube 3 (second electrode unit 15). The grounding electrode tube 3 (second electrode unit 15) may be made of a conductive metal material (such as stainless steel).

In the present embodiment, for example, coupling portions 11 and 12 (coupling plates, end plates, partition portions) are provided at ends 3a and 3b at both sides of the grounding electrode tube 3 in the axial direction. The coupling portions 11 and 12 each have a tubular shape (in the present embodiment, for example, a cylindrical shape) along the tube 2a, and fixed to an inner face 2f of the tube 2a. In the present example, for example, a plurality of grounding electrode tubes 3 and discharge tubes 4 are provided in the housing 2. The coupling portions 11 and 12 couple these grounding electrode tubes 3. The coupling portions 11 and 12 are also provided with a plurality of openings 11a and 12a (holes) that open a plurality of discharge spaces 16 outwardly in the axial direction. The coupling portions 11 and 12 also function as partitions that divide a raw material gas chamber 31 positioned at an upstream side of the discharge space 16 and an ozonized gas chamber 32 positioned at a downstream side of the discharge space 16.

In the present embodiment, for example, a cooling chamber 17 enclosed by the grounding electrode tube 3, the coupling portions 11 and 12, and the tube 2a is provided outside the grounding electrode tube 3. The cooling water introduced into the cooling chamber 17 from the introduction inlet 9 cools the grounding electrode tube 3 (second electrode unit 15), and is discharged from the discharge outlet 10. By cooling the grounding electrode tube 3 (second electrode unit 15), it is possible to prevent the temperature in the discharge space 16 from increasing. Thus, it is possible to more easily prevent the ozone generation efficiency from decreasing due to the temperature rise.

Figure 3:
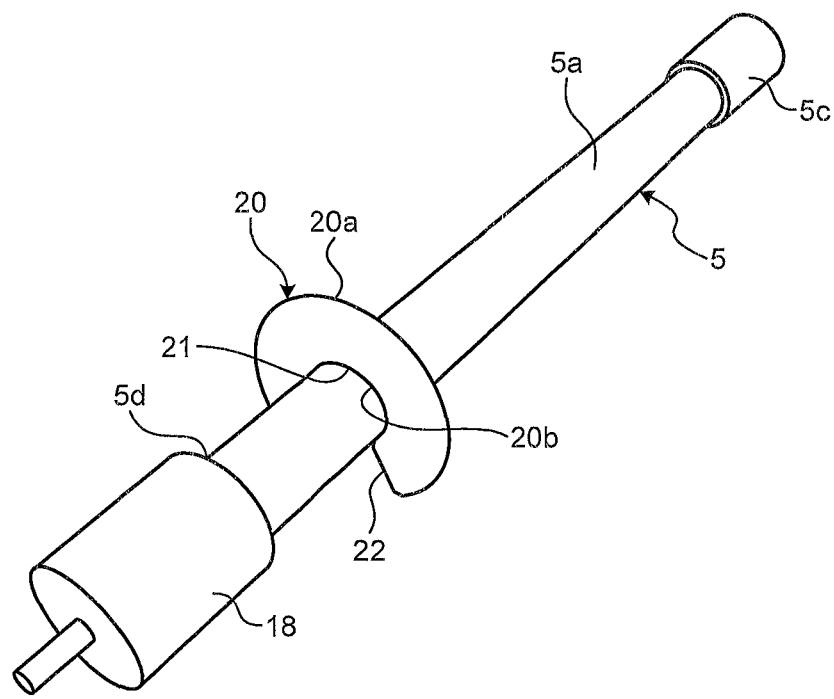
FIG. 3 is a perspective view of an example of a fuse fitted with the fuse holder according to the embodiment.

The fuse 5, for example, as illustrated in FIG. 3, has a cylindrical shape. The fuse 5 includes an outer face 5a (outer peripheral face, outside face, and face) with a diameter (outer diameter) smaller than a diameter (inner diameter) of the inner face 4g of the discharge tube 4. An end 5c at one side of the fuse 5 in the axial direction is connected to a conductor 35 (such as a lead wire and a bus bar), and the fuse 5 and the power supply unit 30 are electrically connected via the conductor 35. A power feed terminal 18 is connected (coupled) to an end 5d at the other side of the fuse 5 in the axial direction. A linear-shaped conductor 19 (such as steel wool and metal wool) is provided between the power feed terminal 18 and the first electrode unit 13. The conductor 19 covers the power feed terminal 18 along the circumference direction of the fuse 5. The first electrode unit 13 is electrically connected to the power supply unit 30 via the power feed terminal 18 and the conductor 19 of the fuse 5. The power feed terminal 18 and the conductor 19 are inserted (pressed) into the inside of the discharge tube 4, thereby the fuse 5 is fitted to the discharge tube 4. In such a state that the fuse 5 is fitted to the discharge tube 4, at least a part of the outer face 5a is positioned inside the discharge tube 4. The grounding electrode tube 3 (second electrode unit 15), the discharge tube 4 (first electrode unit 13), the fuse 5, and the like are respectively arranged inside the housing 2, in a posture extending substantially in a horizontal direction.

Figure 4:
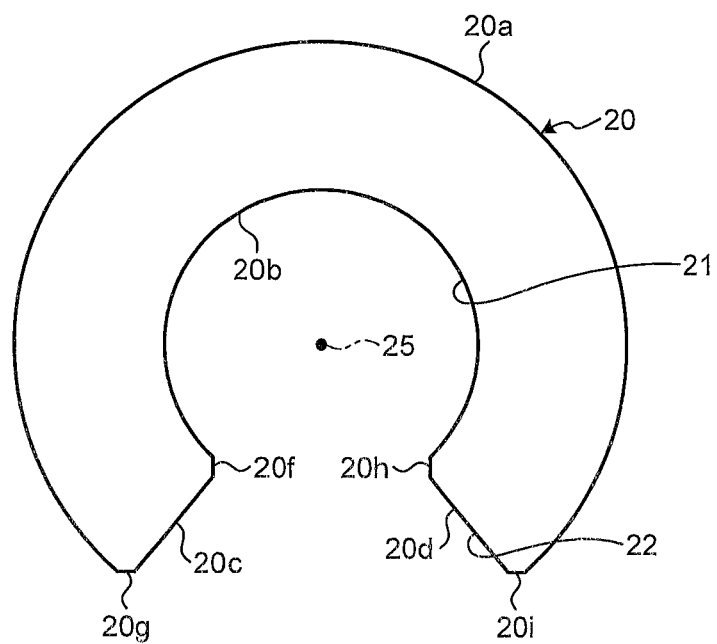
FIG. 4 is a plan view of an example of the fuse holder according to the embodiment.

The fuse holder 20 is provided between the discharge tube 4 and the fuse 5. The fuse holder 20, as illustrated in FIGS. 3 and 4, has an outer periphery 20a and an inner periphery 20b. The fuse holder 20 is provided with an opening 21 (first opening) on the side of an axial center 25 of the inner periphery 20b. The fuse 5 is inserted (pressed) into the opening 21, thereby the inner periphery 20b of the fuse holder 20 comes into contact with the outer face 5a of the fuse 5, and the fuse holder 20 fitted to the fuse 5. The fuse 5 and the fuse holder 20 are inserted (pressed) into the inside of the discharge tube 4, thereby the outer periphery 20a of the fuse holder 20 comes into contact with the inner face 4g of the discharge tube 4. Thus, the fuse holder 20 supports the fuse 5 between the discharge tube 4 and the fuse 5. Here, in the present embodiment, for example, the fuse holder 20 is provided with an opening 22 (second opening) that opens the opening 21 outwardly in the radial direction of the axial center 25. Consequently, the fuse holder 20 is formed substantially in a C shape. In other words, the outer periphery 20a and the inner periphery 20b are formed substantially in a C shape by the opening 22, and the outer periphery 20a comes into contact with the inner face 4g of the discharge tube 4. Thus, according to the present embodiment, a contact area between the outer periphery 20a of the fuse holder 20 and the inner face 4g of the discharge tube 4 is larger than that of the conventional configuration in which three projections provided at even intervals in the circumference direction come into contact with the inner face 4g of the discharge tube 4. Hence, it is possible to more easily prevent the fuse 5 from coming loose.

In the present embodiment, for example, the fuse holder 20 includes two ends 20c and 20d (edges) in the circumference direction, and four corners 20f to 20i (apexes, curves, and ends). The end 20c extends along the radial direction of the axial center 25, from the corner 20f of the inner periphery 20b to the corner 20g of the outer periphery 20a. The end 20d extends along the radial direction of the axial center 25, from the corner 20h of the inner periphery 20b to the corner 20i of the outer periphery 20a. The two ends 20c and 20d face each other, and face the opening 22. The two ends 20c and 20d spread from the inner periphery 20b toward the outer periphery 20a. More specifically, an opening width (distance) between the end 20c and the end 20d on the side of the outer periphery 20a is larger than the diameter of the fuse 5, and an opening width (distance) between the end 20c and the end 20d on the side of the inner periphery 20b is a little smaller than the diameter of the fuse 5. When the fuse holder 20 is fitted to the fuse 5, the fuse 5 is first inserted into the opening 22. The fuse 5 is then guided to the side of the inner periphery 20b by the two tapered-shaped ends 20c and 20d. The fuse 5 is inserted (pressed) into the opening 21, when the fuse holder 20 is pressed into the side of the axial center 25 while being twisted in the thickness direction. In other words, according to the present embodiment, because the two ends 20c and 20d each have a tapered-shape, it is possible to more easily reduce the labor of fitting the fuse holder 20 to the fuse 5. Also, when the fuse holder 20 is once fitted to the fuse 5, it hardly comes off as long as it is not twisted.

In the present embodiment, for example, as illustrated in FIG. 4, all the four corners 20f to 20i of the fuse holder 20 are chamfered. According to the present embodiment, because the two corners 20f and 20h on the side of the inner periphery 20b are chamfered, it is possible to more easily insert the fuse 5 into the opening 21. Also, the two corners 20g and 20i on the side of the outer periphery 20a are chamfered so as to align along the same plane. Thus, it is possible to place the fuse 5 (refer to FIG. 3) fitted with the fuse holder 20 on a placing face (not illustrated) more stably during the installation operation, the maintenance and inspection operation, the replacement operation, and the like. It is also possible to provide a rounded corner (corner R) to each of the corners 20f to 20i.

In the present embodiment, for example, as illustrated in FIGS. 2 and 5, in the state that the fuse holder 20 is interposed between the discharge tube 4 and the fuse 5, the opening 22 is positioned above the opening 21. In other words, the fuse holder 20 is fitted to the fuse 5 in such a state that the opening 22 is directed upward. If the fuse holder 20 is fitted in such a state that the opening 22 is directed downward, there is a possibility that the fuse 5 is apt to come off from the fuse holder 20, because the fuse holder 20 supports the upper side of the fuse 5. In this point, according to the present embodiment, because the fuse holder 20 can support the lower side of the fuse 5, it is possible to more easily prevent the fuse 5 from coming off from the fuse holder 20.

The fuse holder 20, for example, may be made of a synthetic resin material (an elastic material and an elastic body such as glass epoxy) that is excellent in ozone resistance and has elasticity. The fuse holder 20, for example, is formed substantially in a C shape as well as in a plate shape (thin plate shape), by metallic molding, cut processing, and the like. According to the present embodiment, because the fuse holder 20 is formed in a C-shaped plate, the strength and rigidity of the fuse holder 20 can be more easily obtained. Thus, for example, the fuse holder 20 can support the fuse 5 by being more stably interposed between the discharge tube 4 and the fuse 5. Also, because the fuse holder 20 is formed of an elastic body and has a notch (opening 22), the fuse holder 20 can be more easily fitted to the fuse 5 by being twisted and deformed elastically.

In this manner, in the present embodiment, for example, the fuse holder 20 is provided with the opening 21 (first opening) to receive the fuse 5, and the opening 22 (second opening) that opens the opening 21 outwardly in the radial direction of the axial center 25. The fuse holder 20 is also formed substantially in a C shape as well as in a plate shape. Thus, according to the present embodiment, for example, the outer periphery 20a of the fuse holder 20 can come into contact with the inner face 4g of the discharge tube 4 with a larger area than that of the conventional configuration. Hence, according to the present embodiment, for example, it is possible to more easily prevent the fuse 5 from coming loose, and the fuse holder 20 can more easily support the fuse 5. According to the present embodiment, for example, because it is possible to prevent the fuse 5 from coming loose, the operation of connecting the conductor 35 to the fuse 5 can be performed more easily, more smoothly, or more accurately.

In the present embodiment, for example, the fuse holder 20 is fitted to the fuse 5 in such a state that the opening 22 (second opening) is positioned above the opening 21 (first opening). Thus, according to the present embodiment, for example, the fuse holder 20 can support the lower side of the fuse 5 that extends substantially in the horizontal direction. Hence, for example, compared to the configuration in which the fuse holder 20 supports the upper side of the fuse 5, it is possible to more easily prevent the fuse 5 from coming off from the fuse holder 20. In other words, it is possible to support the fuse 5 further more stably.

In the present embodiment, for example, the corners 20f and 20h of the inner periphery 20b of the fuse holder 20 are chamfered. Thus, according to the present embodiment, for example, the fuse 5 can be more easily installed (inserted) into the opening 21. Consequently, for example, it is possible to more easily reduce the labor of fitting the fuse holder 20 to the fuse 5.

In the present embodiment, for example, the corners 20g and 20i of the outer periphery 20a of the fuse holder 20 are chamfered. Thus, according to the present embodiment, for example, the end faces of the corners 20g and 20i can be placed on a placing face more stably, in such a state that the fuse holder 20 is fitted to the fuse 5. Also, for example, it is possible to more easily prevent the fuse 5 placed on the placing face from rolling. Hence, for example, the operation of fitting the fuse 5 and the fuse holder 20 to the discharge tube 4 can be performed more easily, more smoothly, or more accurately.

In the present embodiment, for example, the ends 20c and 20d of the fuse holder 20 each have a tapered shape spreading from the inner periphery 20b toward the outer periphery 20a. Thus, according to the present embodiment, for example, it is possible to more easily reduce the labor of fitting the fuse holder 20 to the fuse 5, compared to that of the configuration in which the ends 20c and 20d of the fuse holder 20 are provided in parallel with each other.

While the embodiment of the present invention has been described, the above-described embodiment is merely an example, and is not intended to limit the scope of the invention. The above-described embodiment may be implemented in various other forms, and various omissions, replacements, combinations, and modifications may be made without departing from the scope and spirit of the invention. The above-described embodiment is included in the scope and spirit of the invention and is included in the invention described in the claims and their equivalents. The specifications of each component (structure, type, direction, shape, size, length, width, thickness, height, number, arrangement, position, material, and the like) can be suitably modified.

The invention claimed is:

1. An ozone generation device, comprising:
    a first electrode unit provided on an inner face of a discharge tube having a cylindrical shape;
    a second electrode unit provided outside the discharge tube at an interval, the second electrode unit facing the first electrode unit;
    a fuse comprising an outer face, a diameter of the outer face is smaller than a diameter of the inner face, the fuse having a cylindrical shape, at least a part of the outer face being positioned inside the discharge tube; and
    a fuse holder having a C shape as well as a plate shape substantially, the fuse holder being interposed between the discharge tube and the fuse, the fuse holder comprising the outer periphery and an inner periphery and being provided with a first opening and a second opening, the outer periphery extending in an arc along the inner face to come into contact with the inner face, the inner periphery extending in an arc along the outer face to come into contact with the outer face, the first opening being positioned on a side of an axial center of the inner periphery to receive the fuse, the second opening opening the first opening outwardly in a radial direction of the axial center.

2. The ozone generation device according to claim 1, wherein
    the discharge tube and the fuse are provided in a posture extending substantially in a horizontal direction, and
    the fuse holder is fitted to the fuse in a state that the second opening is positioned above the first opening.

3. The ozone generation device according to claim 1, wherein
    the fuse holder has four corners that face the second opening, and at least two of the four corners at the inner periphery are chamfered.

4. The ozone generation device according to claim 3, wherein two corners at the outer periphery are also chamfered and end faces of the two corners on the outer periphery are mutually aligned along a same plane.

5. A fuse holder, comprising:

an outer periphery that extends in an arc along an inner face of a discharge tube to come into contact with the inner face; and an inner periphery that extends in an arc along an outer face of a fuse to come into contact with the outer face, wherein the fuse holder has a C shape as well as a plate shape substantially and is provided with a first opening positioned on a side of an axial center of the inner periphery to receive the fuse and a second opening that opens the first opening outwardly in a radial direction of the axial center.

* * * * *